Oct. 28, 1969  T. G. CAMPBELL ET AL  3,474,547
BAFFLE APPARATUS FOR SELF-LOADING SCRAPERS
Filed Feb. 23, 1967  3 Sheets-Sheet 1

INVENTORS
TREVOR G. CAMPBELL
LARRY G. EFTEFIELD
RAYMOND L. MOSER
BY
ATTORNEYS

Oct. 28, 1969 T. G. CAMPBELL ET AL 3,474,547
BAFFLE APPARATUS FOR SELF-LOADING SCRAPERS
Filed Feb. 23, 1967 3 Sheets-Sheet 2

INVENTORS
TREVOR G. CAMPBELL
LARRY G. EFTEFIELD
RAYMOND L. MOSER
BY
ATTORNEYS

Oct. 28, 1969 T. G. CAMPBELL ET AL 3,474,547
BAFFLE APPARATUS FOR SELF-LOADING SCRAPERS
Filed Feb. 23, 1967 3 Sheets-Sheet 3
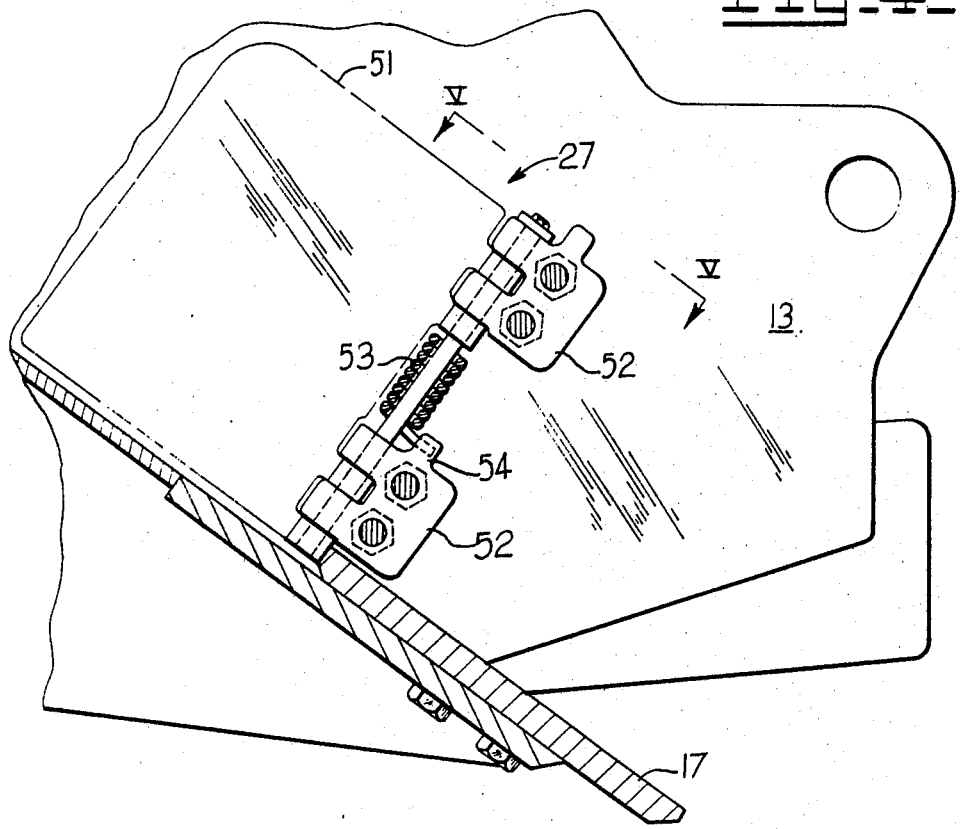
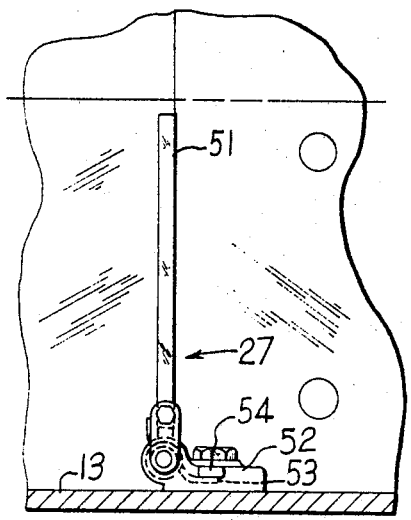
INVENTORS
TREVOR G. CAMPBELL
LARRY G. EFTEFIELD
RAYMOND L. MOSER
BY
ATTORNEYS

United States Patent Office 3,474,547
Patented Oct. 28, 1969

3,474,547
BAFFLE APPARATUS FOR SELF-LOADING SCRAPERS
Trevor G. Campbell, Peoria, Larry G. Eftefield, Joliet, and Raymond L. Moser, Tremont, Ill., assignors to Caterpillar Tractor Co., Peoria, Ill., a corporation of California
Filed Feb. 23, 1967, Ser. No. 617,919
Int. Cl. E02f 3/76; B60p 1/36; F02b 3/62
U.S. Cl. 37—8          4 Claims

ABSTRACT OF THE DISCLOSURE

Baffle apparatus for retaining loose material in a scraper bowl prior to unloading. Cutting means are disposed along the forward end of the bowl floor to define a throat region thereabove through which material to be loaded passes into the scraper bowl. Baffle means are disposed generally behind the cutting means to tend to close off the scraper throat region, but which are movable out of closing relation with the scraper throat region by material being loaded into the scraper bowl.

Background of the invention

Usual self-loading elevator scrapers are not equipped with a movable apron to positively close the scraper bowl during transportation of loaded material to an unloading site. Rather, the mere proximity of the elevator assembly to the scraper cutting edge is relied upon to retain loaded material in the scraper bowl. Since the elevator assembly is not in positive contact with the scraper cutting means, a problem arises when loose material such as sandy soil is to be loaded and transported by a self-loading elevator scraper. A substantial portion of such material may sift or spill out between the elevator and the cutting edge during transportation to an unloading site. This loss of material seriously decreases the operating efficiency of the scraper. Spillage of the material on the scraper haulways may also cause the scrapers to operate at slower transporting speeds, thus decreasing efficiency still further.

Summary of the invention

The present invention provides baffle apparatus for retaining loose loaded material in the scraper bowl until the bowl is to be unloaded. Scraper cutting means define a scraper bowl throat region through which material to be loaded passes into the scraper bowl. Baffle means are movably disposed generally behind the cutting means to tend to close off the scraper bowl throat region. The baffle means are capable of being moved out of closing relation with the throat region by material being loaded into the scraper bowl.

Brief description of the drawing

FIG. 4 is a fragmentary side view of the scraper bowl and scraper cutting edge with an alternate embodiment of the baffle plate.

FIG. 5 is a view taken on line V—V of FIG. 4 illustrating the alternate baffle plate in relation to the bowl side wall.

Description of the preferred embodiment

Figure 1:
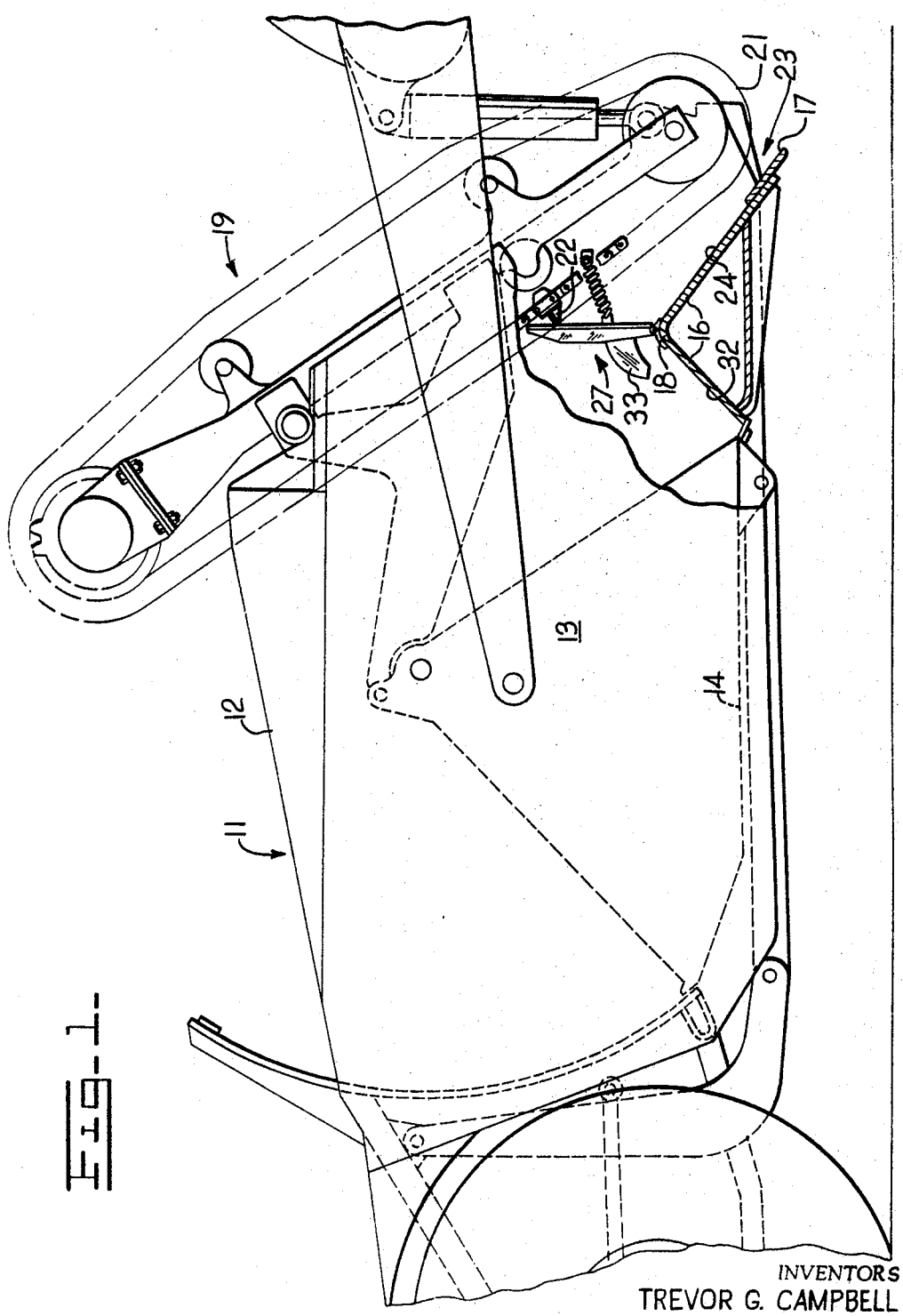
FIG. 1 is a partial side view in elevation of an elevator scraper including baffle apparatus of the present invention.

Referring to FIG. 1, a typical self-loading elevator scraper 11 comprises bowl assembly 12 having two side walls 13 and a bowl floor 14. An arched cutting edge support 16, to which cutting edge 17 is attached and which has an apex 18 disposed transversely across bowl 12, forms the forward portion of the scraper bowl floor. To assist in loading material into the scraper bowl, an elevator assembly 19 is disposed to have an end 21 forwardly and downwardly extending generally above the cutting edge. A continuous track of elevator flights 22 (only one flight shown) is disposed for clockwise rotation about the elevator assembly.

The spaced relation of elevator end 21 with the cutting edge forms an entrance or throat region 23 generally above the cutting edge through which material passes into the scraper bowl. The spaced relation between a forward ramp surface 24 of the cutting edge support 16 and the elevator assembly forms an extension of throat region 23. When the scraper bowl has been filled and rotation of the elevator halted, loose material in the bowl may readily sift or spill out through the throat region. Such spillage is increased by jostling of loaded material in the bowl when the scraper 11 is moving to an unloading site.

Figure 2:
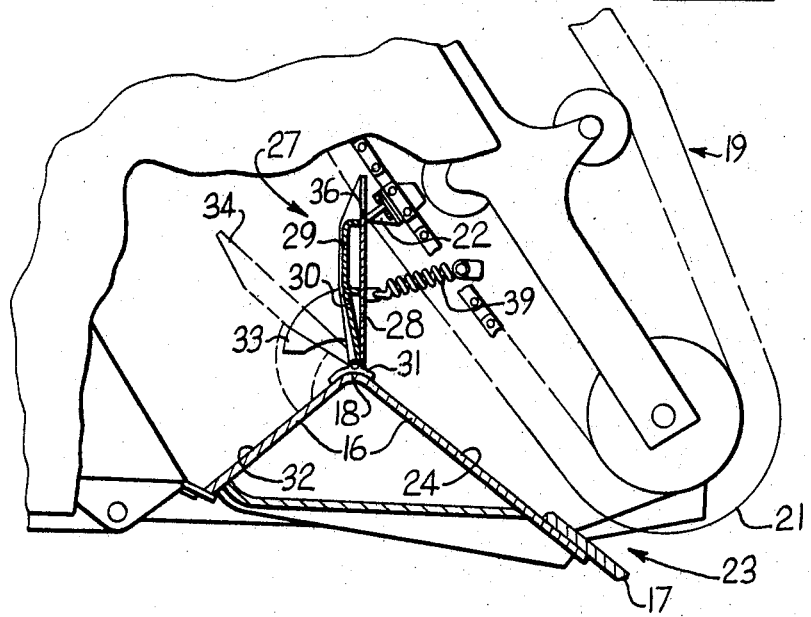
FIG. 2 is a fragmentary side view partially in section showing the baffle apparatus with respect to the scraper elevator.
Figure 3:
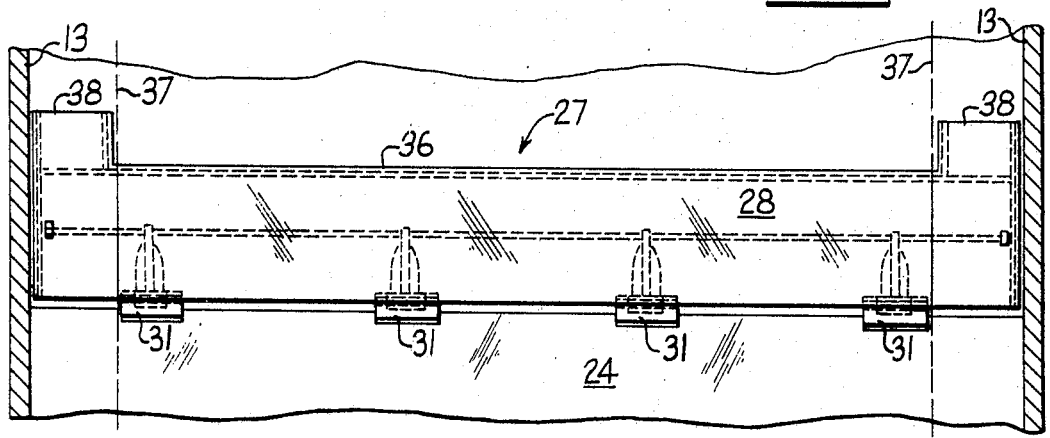
FIG. 3 is a plan view of a baffle plate hinged to the scraper.

The prevent material from spilling through the throat region, baffle means 27 is disposed generally behind the cutting edge to tend to close off the throat region. However, baffle means 27 is movable out of closing relation with the throat region by material being loaded into the bowl. Referring particularly to FIG. 2, the baffle comprises a baffle plate 28 which extends transversely across the lower front portion of the bowl and is pivotally connected to apex 18 of cutting means support 16 by hinges 31. A channel member 29 and a structural plate 30 are disposed along the back surface of the baffle plate to provide structural reinforcement. Stop 33 is disposed on the rear of the structurally reinforced baffle plate to limit its rearward motion at a position indicated at 34. Thus, the baffle plate is prevented from being moved rearwardly against a rear cutting edge support surface 32 and being held there by material in the bowl. Baffle plate 28 is of such a width that its leading edge 36 is disposable in abutting relation along the edge of an elevator flight. Referring particularly to FIG. 3, typical elevator flight 22 has ends 37 which are not co-extensive with the width of the bowl, but rather are spaced apart from the bowl sidewalls. Thus, when the baffle plate leading edge 36 is disposed to abut with an elevator flight, material from the bowl may spill out through the spaces at the flight ends 37. To prevent such spillage, the baffle plate has reinforced projections 38 at either end of its leading edge to substantially close off the spaces at the flight ends.

When the scraper is being loaded, material moving over the cutting edge and through the throat region forces the baffle plate backward to position 34 with the baffle plate stop 33 resting on the rear cutting edge support surface. When loading is completed and operation of the elevator is halted, loose material in the bowl, jostled by motion of the scraper, tends to move downward through the throat region. Such movement of material from the bowl tends to move the baffle plate into abutting relation with the elevator flight to close off the throat region and prevent further spillage. To assure rapid closing of the throat region, two tension springs 39 are disposed to interact between either end of the baffle plate and the bowl side walls to urge the baffle plate into closing relation with the throat region. The combined action of springs 39 along with motion of loose material in the bowl insures rapid closing of the baffle plate to substantially prevent spillage from the bowl.

Referring to FIGS. 4 and 5, an alternate embodiment of baffle means 27 comprises two baffle plates 51 (one of which is shown) each pivotally connected to the bowl side walls by a spring loaded hinge 52 generally behind the cutting means. Having reference also to FIGS. 1 and 3, elevator flights 22 are sufficiently closely spaced that, regardless of when elevator rotation is halted, one of the flights will be in close proximity to the cutting edge. Thus, a substantial portion of the spillage described above results from the spaced apart relation of the flight ends 37 and the bowl side walls, i.e. through the sides of the throat region. Baffle plates 51 are of such a size and hinged orientation on the side walls, when pivoted forwardly, they rest against cutting means 17 and close off the sides of the throat region to prevent the substantial portion of spillage described immediately above. The baffle plates are similarly capable of being moved out of closing relation with the throat region by material being loaded into the bowl. A spring arm 53 is disposed to interact between each baffle plate and a spring stop 54 to urge the baffle plate to pivot forwardly into abutting relation with the cutting means and closing relation with the throat region. As baffle plate 51 is pivotally moved rearwardly by material entering the scraper bowl, the spring loading on the plate increases tending to prevent its continued rearward pivoting to a position flush with the side wall where loaded material would prevent its subsequent forward pivotal motion to close with the throat region.

Baffle plates 36 and 51 may also be provided with means to fasten them back and out of the way when the scraper is loading material which is not loose and not subject to spilling.

What is claimed is:

1. Baffle apparatus in a self-loading scraper having a scraper bowl open at its forward end, two bowl sidewalls, an elevator with a continuous flight track, an end of the elevator projecting forwardly and downwardly at the forward open end of the bowl, comprising a cutting blade supported at the forward open end of the bowl and generally below the elevator end to define a throat region through which material to be loaded passes into the bowl and a baffle plate pivotally hinged to the scraper generally adjacent the throat region, said baffle plate extending between the bowl sidewalls and being of a suitable width to abut with the scraper elevator to close off the throat region defined by said cutting blade and the scraper elevator, said baffle plate being movable out of closing relation with the scraper throat region by material passing therethrough.

2. Baffle apparatus according to claim 1 wherein the scraper bowl includes a cutting blade support to which the cutting blade is attached, said baffle plate having spring means interacting between said baffle plate and the bowl assembly to urge said baffle plate into abutting relation with the scraper elevator.

3. Baffle apparatus according to claim 2 wherein the ends of the elevator flights are spaced away from the scraper bowl sidewalls and wherein said baffle plate has a leading edge opposite its hinged connection said baffle plate being disposable with its leading edge against one of the elevator flights, said baffle plate having projections at the ends of its leading edge to close off the spaces defined between the elevator flight and the bowl sidewalls.

4. Baffle apparatus in a self-loading scraper having a scraper bowl open at its forward end, two bowl sidewalls, an elevator with a continuous flight track, an end of the elevator projecting forwardly and downwardly at the forward open end of the bowl, comprising a cutting blade supported at the forward open end of the bowl and generally below the forward elevator end to define a throat region through which material to be loaded passes into the bowl, a baffle plate pivotably hinged to each of the two bowl sidewalls adjacent the throat region defined by said cutting means and the scraper elevator, each of said baffle plates disposable to close off at least a substantial portion of the scraper throat region adjacent the bowl sidewall to which the baffle plate is hinged, said baffle plates being movable out of closing relation with the scraper throat region by material passing therethrough, and spring means interacting between each sidewall and said baffle plate hinged thereto to urge said baffle plates into closing relation with the scraper throat region.

References Cited

UNITED STATES PATENTS

| | | | |
|---|---|---|---|
| 2,657,481 | 11/1953 | Larsen | 37—124 |
| 3,200,520 | 8/1965 | Nicholls | 37—129 |
| 3,328,903 | 7/1967 | Campbell et al. | 37—129 |

ROBERT E. PULFREY, Primary Examiner

CLIFFORD D. CROWDER, Assistant Examiner

U.S. Cl. X.R.

37—126